United States Patent
Jung et al.

(10) Patent No.: US 11,340,644 B2
(45) Date of Patent: May 24, 2022

(54) ELECTRONIC DEVICE INCLUDING LOW-DROPOUT REGULATORS

(71) Applicant: Samsung Electronics Co., Ltd., Suwon-si (KR)

(72) Inventors: Donghoon Jung, Hwaseong-si (KR); Tae-Hwang Kong, Suwon-si (KR); Sangho Kim, Suwon-si (KR); Junhyeok Yang, Seoul (KR); Jeongpyo Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/315,621

(22) Filed: May 10, 2021

(65) Prior Publication Data

US 2022/0100218 A1    Mar. 31, 2022

(30) Foreign Application Priority Data

Sep. 29, 2020    (KR) .................. 10-2020-0126773

(51) Int. Cl.
*G05F 1/575*    (2006.01)
*H02M 3/07*    (2006.01)
*H02M 1/00*    (2006.01)

(52) U.S. Cl.
CPC .............. *G05F 1/575* (2013.01); *H02M 3/07* (2013.01); *H02M 1/0045* (2021.05)

(58) Field of Classification Search
CPC ........ G05F 1/575; H02M 3/07; H02M 1/0045
See application file for complete search history.

(56) References Cited

U.S. PATENT DOCUMENTS

| | | | |
|---|---|---|---|
| 7,372,382 B2 | 5/2008 | Hazucha et al. | |
| 8,841,893 B2 | 9/2014 | Bulzacchelli et al. | |
| 9,734,904 B1 | 8/2017 | Cho et al. | |
| 10,108,212 B2 | 10/2018 | Park et al. | |
| 10,185,338 B1 | 1/2019 | Lahiri et al. | |
| 10,488,875 B1 | 11/2019 | Olieman et al. | |
| 2018/0292851 A1 | 10/2018 | Mahajan et al. | |
| 2019/0079551 A1 | 3/2019 | Tourret | |
| 2019/0212762 A1* | 7/2019 | Heo | G05F 1/59 |
| 2019/0220074 A1 | 7/2019 | Muthukaruppan et al. | |

FOREIGN PATENT DOCUMENTS

KR    1020170089742 A    8/2017
KR      101901051 B1    9/2018

* cited by examiner

*Primary Examiner* — Sibin Chen
(74) *Attorney, Agent, or Firm* — Muir Patent Law, PLLC

(57) ABSTRACT

Disclosed is an electronic device, which includes an amplifier circuit that receives a feedback voltage and a reference voltage and amplifies a difference between the feedback voltage and the reference voltage to output an amplified difference voltage, an analog-to-digital converter that converts the amplified difference voltage to a digital code including two or more bits, and low-dropout (LDO) regulators that outputs output voltages based on the digital code. Each of the LDO regulators includes power transistors outputting a corresponding output voltage of the output voltages, drives one of the power transistors in a switching state, and drives each of remaining power transistors in a turned-on state or a turned-off state.

20 Claims, 13 Drawing Sheets

| IL | 271 | 272 | 273 | 274 |
|---|---|---|---|---|
| Light ↓ Heavy | Switching | OFF | OFF | OFF |
| | ON Duty 0% | Switching | OFF | OFF |
| | ON | ON Duty 0% | Switching | OFF |
| | ON | ON | ON Duty 0% | Switching |

ELECTRONIC DEVICE INCLUDING LOW-DROPOUT REGULATORS

CROSS-REFERENCE TO RELATED APPLICATIONS

This application claims priority under 35 U.S.C. § 119 to Korean Patent Application No. 10-2020-0126773 filed on Sep. 29, 2020, in the Korean Intellectual Property Office, the disclosure of which is incorporated by reference herein in its entirety.

BACKGROUND

Embodiments of the present disclosure described herein relate to an electronic device, and more particularly, relate to an electronic device including low-dropout regulators generating output voltages with improved response speed and accuracy.

As the degree of integration of an integrated circuit increases and an operating speed is improved, the amount of current that the integrated circuit consumes is increasing. A high-performance integrated circuit such as a processing core may require a large current of several amperes. A current of several amperes may increase a dropout voltage at analog low-dropout (LDO) regulators. As such, a digital LDO regulator in which a dropout voltage is smaller than that of an analog LDO regulator is being developed.

The analog LDO regulator may adjust the amount of current flowing through a power transistor by adjusting a channel size of the power transistor. The digital LDO regulator may adjust the amount of current flowing through a power transistor by switching the power transistor. The expression "switching" may mean that the power transistor repeatedly transitions between an on state and an off state.

SUMMARY

Embodiments of the present disclosure provide an electronic device including low-dropout regulators generating output voltages with improved response speed and accuracy.

According to an embodiment, an electronic device includes an amplifier circuit that receives a feedback voltage and a reference voltage and amplifies a difference between the feedback voltage and the reference voltage to output an amplified difference voltage, an analog-to-digital converter that converts the amplified difference voltage to a digital code including two or more bits, and low-dropout (LDO) regulators that outputs output voltages based on the digital code. Each of the LDO regulators includes power transistors outputting a corresponding output voltage of the output voltages, drives one of the power transistors in a switching state, and drives each of remaining power transistors in a turned-on state or a turned-off state.

According to an embodiment, an electronic device includes two or more low-dropout (LDO) regulators, an amplifier circuit that receives a feedback voltage and a reference voltage and amplifies a difference between the feedback voltage and the reference voltage to output an amplified difference voltage, an analog-to-digital converter that converts the amplified difference voltage to a first digital code including two or more bits, and a calibration circuit that receives output voltages of the two or more LDO regulators and outputs second digital codes based on differences between the output voltages. The two or more LDO regulators adjust the output voltages in response to the first digital code and the second digital codes.

According to an embodiment, an electronic device includes an integrated circuit, a power rail that supplies the integrated circuit with a power on the integrated circuit, low-dropout (LDO) regulators that are distributed and disposed around the power rail and supplies output voltages to the power rail, and a global logic circuit that receives a feedback voltage from a feedback node on the power rail and outputs a digital code to the LDO regulators. The LDO regulators generate the output voltages based on the digital code. The global logic circuit includes an amplifier circuit that amplifies a difference between the feedback voltage and a reference voltage to output an amplified difference voltage, and an analog-to-digital converter that converts the amplified difference voltage to the digital code including two or more bits.

BRIEF DESCRIPTION OF THE FIGURES

The above and other objects and features of the present disclosure will become apparent by describing in detail embodiments thereof with reference to the accompanying drawings.

DETAILED DESCRIPTION

Example embodiments of the present disclosure will be more clearly understood from the following detailed description taken in conjunction with the accompanying drawings.

Figure 1:
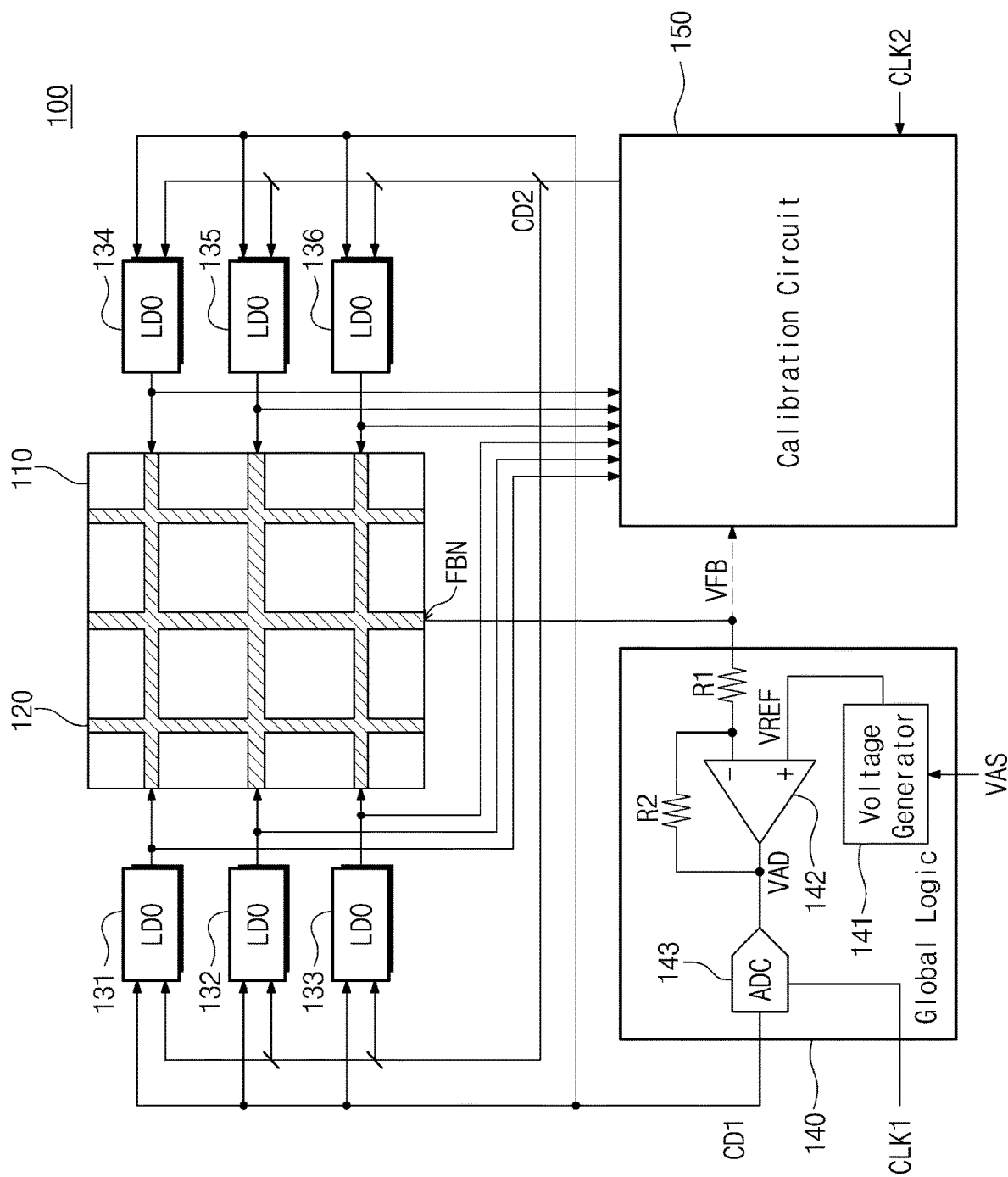
FIG. 1 illustrates an electronic device according to an embodiment of the present disclosure.

FIG. 1 illustrates an electronic device 100 according to an embodiment of the present disclosure. Referring to FIG. 1, the electronic device 100 may include an integrated circuit 110, a power rail 120, first to sixth low-dropout (LDO) regulators 131 to 136, a global logic circuit 140, and a calibration circuit 150.

The integrated circuit 110 may include semiconductor circuits integrated and manufactured as a semiconductor die. The integrated circuit 110 may include one of various semiconductor integrated circuits such as a central processing unit, an application processor, a graphics processor, and a system-on-chip.

The power rail 120 may be formed on the integrated circuit 110 and may be formed of a conductive material. The power rail 120 may be connected with two or more portions of the integrated circuit 110 and may supply a power to the integrated circuit 110. In an embodiment, the power rail 120 is illustrated in the shape of a lattice, but a structure of the power rail 120 is not limited thereto.

The first to sixth LDO regulators 131 to 136 may be distributed and disposed around the power rail 120. The first to sixth LDO regulators 131 to 136 may be connected with the power rail 120 and may supply output voltages to the power rail 120, respectively. The first to sixth LDO regulators 131 to 136 that are distributed and disposed may uniformly maintain a voltage of the power rail 120.

For example, when current consumption sharply increases or decreases at a specific portion of the integrated circuit 110, the first to sixth LDO regulators 131 to 136 being distributed and disposed may prevent a voltage of the specific portion of the power rail 120 from sharply increasing or decreasing.

The first to sixth LDO regulators 131 to 136 may receive a first digital code CD1 from the global logic circuit 140 and may receive second digital codes CD2 from the calibration circuit 150, respectively. Each of the first to sixth LDO regulators 131 to 136 may generate an output voltage in response to the first digital code CD1 and the corresponding digital code of the second digital codes CD2.

The first to sixth LDO regulators 131 to 136 may be referred to as "local LDO regulators" in terms of being separated from the global logic circuit 140 and disposed around the power rail 120.

An embodiment is illustrated in FIG. 1 as the first to sixth LDO regulators 131 to 136 supply the output voltages to the power rail 120. However, the number of LDO regulators that are distributed and disposed to supply the output voltages to the power rail 120 is not limited.

The global logic circuit 140 may receive a feedback voltage VFB from a feedback node FBN of the power rail 120. The feedback node FBN may correspond to a point (e.g., the center) on the power rail 120. The feedback node FBN may be a point on the power rail 120, which corresponds to a point of the integrated circuit 110 at which current consumption (e.g., a load current) is relatively great (or the greatest). The feedback node FBN may be a point corresponding to a portion of the power rail 120 at which the feedback node FBN is connected with the integrated circuit 110.

An embodiment is illustrated in FIG. 1 as the global logic circuit 140 directly receives the feedback voltage VFB from the feedback node FBN. In another embodiment, the feedback node FBN may be connected with a distribution circuit including two or more resistance elements. A voltage of a node between the two or more resistance elements may be transferred to the global logic circuit 140 as the feedback voltage VFB.

The global logic circuit 140 may receive a voltage trim signal VAS. The voltage trim signal VAS may be received from an external device, for example, from a power management integrated circuit (PMIC) 1010 (refer to FIG. 14). The global logic circuit 140 may receive a first clock signal CLK1. The global logic circuit 140 may generate the first digital code CD1 in response to the feedback voltage VFB, the voltage trim signal VAS, and the first clock signal CLK1.

The global logic circuit 140 may include a voltage generator 141, an amplifier 142, an analog-to-digital converter (ADC) 143, a first resistor R1, and a second resistor R2. The voltage generator 141 may receive the voltage trim signal VAS. The voltage generator 141 may generate a reference voltage VREF in response to the voltage trim signal VAS. For example, the voltage generator 141 may adjust a level of the reference voltage VREF to a level that the voltage trim signal VAS indicates.

A positive input of the amplifier 142 may receive the reference voltage VREF from the voltage generator 141. A negative input of the amplifier 142 may receive the feedback voltage VFB through the first resistor R1 and may be connected with an output node thereof through the second resistor R2. The amplifier 142, the first resistor R1, and the second resistor R2 may constitute an amplifier circuit having a gain defined by the first resistor R1 and the second resistor R2. The amplifier circuit may amplify a difference between the reference voltage VREF and the feedback voltage VFB based on the gain and may output an amplification result as an amplified difference voltage VAD.

In an embodiment, the amplifier 142 may be an error amplifier. A capacitor, not illustrated, for suppressing an oscillation or ripple of the amplified difference voltage VAD may be additionally connected with the output of the amplifier 142.

The analog-to-digital converter 143 may receive the amplified difference voltage VAD. The analog-to-digital converter 143 may convert the amplified difference voltage VAD to the first digital code CD1. The first digital code CD1 may indicate a difference between the reference voltage VREF and the feedback voltage VFB and may include two or more bits. The two or more bits may include at least the following information: "the reference voltage VREF is greater than the feedback voltage VFB", "the reference voltage VREF is considerably greater than the feedback voltage VFB", "the reference voltage VREF is smaller than the feedback voltage VFB", and "the reference voltage VREF is considerably smaller than the feedback voltage VFB". The first digital code CD1 may be transferred in common to the first to sixth LDO regulators 131 to 136.

In an embodiment, the analog-to-digital converter 143 may be a flash analog-to-digital converter that converts the amplified difference voltage VAD to the first digital code CD1 within one clock cycle of the first clock signal CLK1.

The calibration circuit 150 may receive the output voltages of the first to sixth LDO regulators 131 to 136. The calibration circuit 150 may receive a second clock signal CLK2. A frequency of the second clock signal CLK2 may be the same as or different from a frequency of the first clock signal CLK1. As an option, the calibration circuit 150 may receive the feedback voltage VFB.

The calibration circuit 150 may generate the second digital codes CD2 based on the output voltages of the first to sixth LDO regulators 131 to 136 and the second clock signal CLK2 (or based on the output voltages, the second clock signal CLK2, and the feedback voltage VFB). The second digital codes CD2 may calibrate differences between the output voltages of the first to sixth LDO regulators 131 to 136.

The calibration circuit 150 may provide the first to sixth LDO regulators 131 to 136 with the second digital codes CD2, each of which being different. The calibration circuit 150 may transfer the second digital codes CD2 to the first to sixth LDO regulators 131 to 136 corresponding thereto, respectively. The second digital codes CD2 may include two or more bits. The number of bits (or a resolution) of each of the second digital codes CD2 may be the same as or different from (e.g., less than) the number of bits (or a resolution) of the first digital code CD1.

In an embodiment, the electronic device 100 may support dynamic voltage scaling (DVS). According to the dynamic voltage scaling, power consumption may be adjusted by adjusting a level of a voltage depending on an operating mode or the given amount of power. Conventional dynamic voltage scaling is performed by a PMIC. However, the dynamic voltage scaling performed by the PMIC is disadvantageous in that a response speed is slow.

The electronic device 100 according to an embodiment of the present disclosure may adjust target output voltages of the first to sixth LDO regulators 131 to 136 by adjusting the voltage trim signal VAS. A speed at which the output voltages of the first to sixth LDO regulators 131 to 136 reach the target output voltages may be faster than a dynamic voltage scaling speed of the PMIC. Accordingly, the electronic device 100 according to an embodiment of the present disclosure may support high-speed dynamic voltage scaling.

The global logic circuit 140 may generate the first digital code CD1 based on a difference between the feedback voltage VFB and the reference voltage VREF. A level of the feedback voltage VFB may be adjusted by the first digital code CD1. That is, the feedback voltage VFB, the global logic circuit 140, and the first digital code CD1 may form a global control loop.

The global control loop may adjust the feedback voltage VFB, that is, a voltage of the power rail 120 to a target output voltage. The global control loop may support a relatively slow response speed (compared to a local control loop) but may control a voltage of the power rail 120 to a target output voltage relatively more accurately (compared to the local control loop).

Each of the first to sixth LDO regulators 131 to 136 may include a local control loop corresponding to a change of an output voltage, of a corresponding first to sixth LDO regulators 131 to 136, that varies depending on a change of an output current (e.g., a load current). Because a local control loop corresponds to a change of an output voltage, the local control loop may control a level of an output voltage relatively less accurately than a global control loop corresponding to a change of a voltage of the power rail 120 but may support a relatively fast response speed (compared to the global control loop).

Figure 2:
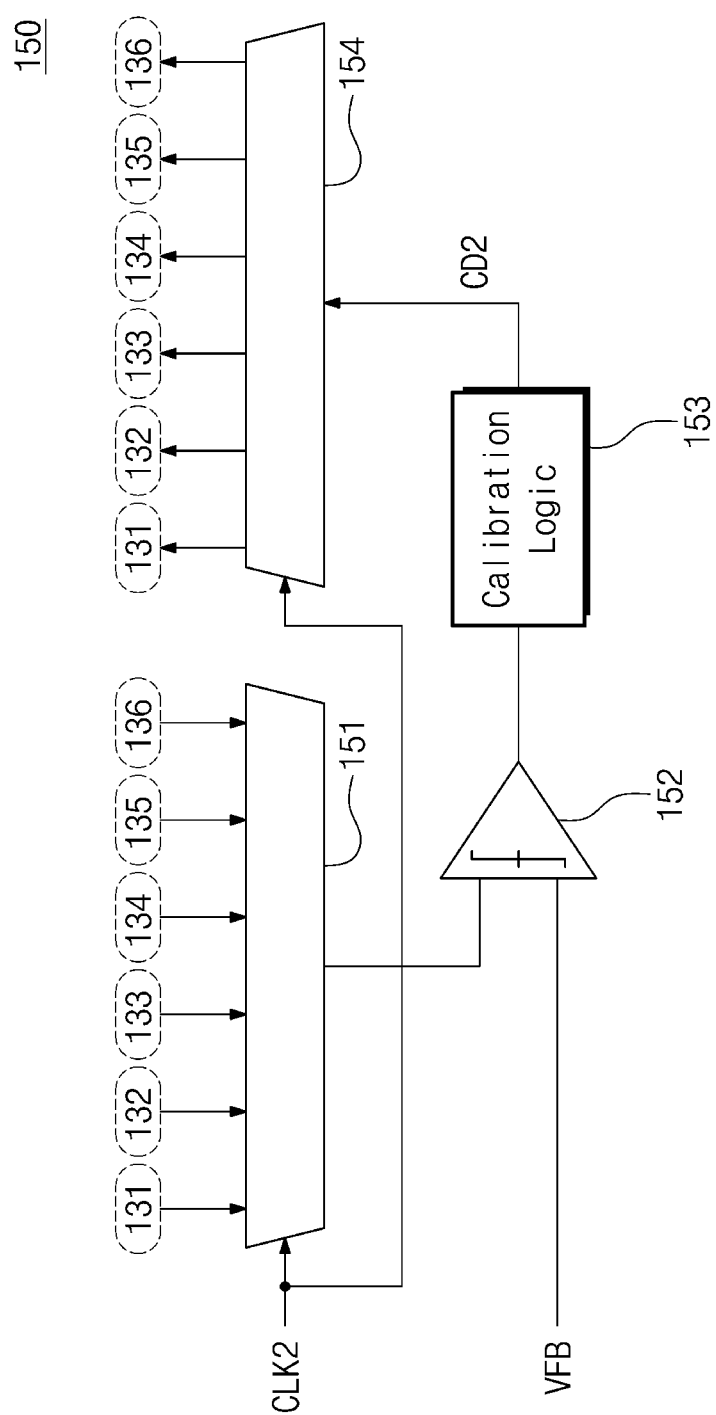
FIG. 2 illustrates a calibration circuit according to a first example.

FIG. 2 illustrates the calibration circuit 150 according to a first example. Referring to FIGS. 1 and 2, the calibration circuit 150 may include a multiplexer 151, a comparator 152, a calibration logic circuit 153, and a demultiplexer 154.

The multiplexer 151 may receive the output voltages of the first to sixth LDO regulators 131 to 136. The multiplexer 151 may receive the second clock signal CLK2. In response to the second clock signal CLK2, the multiplexer 151 may select the output voltages of the first to sixth LDO regulators 131 to 136 in turn. For example, the multiplexer 151 may select output voltages of the first to sixth LDO regulators 131 to 136 sequentially (e.g., in a round robin manner). The multiplexer 151 may transfer a selected output voltage to the comparator 152.

The comparator 152 may compare an output voltage transferred from the multiplexer 151 and the feedback voltage VFB. A comparison result of the comparator 152 may be transferred to the calibration logic circuit 153. The calibration logic circuit 153 may generate the second digital code CD2 based on the comparison result of the comparator 152. For example, the calibration logic circuit 153 may generate the second digital code CD2 based on a variety of information such as an output of the comparator 152, an operating mode, previous outputs of the comparator 152, a level of a selected output voltage, a level of the feedback voltage VFB, and the like. The second digital code CD2 may be transferred to the demultiplexer 154.

The demultiplexer 154 may receive the second digital code CD2 from the calibration logic circuit 153 and may receive the second clock signal CLK2. The demultiplexer 154 may transfer the second digital code CD2 to one of the first to sixth LDO regulators 131 to 136 in response to the second clock signal CLK2. For example, the demultiplexer 154 may select the first to sixth LDO regulators 131 to 136 in turn or sequentially (e.g., in a round robin manner). The demultiplexer 154 may output the second digital code CD2 to a selected LDO regulator of the first to sixth LDO regulators 131 to 136.

Figure 3:
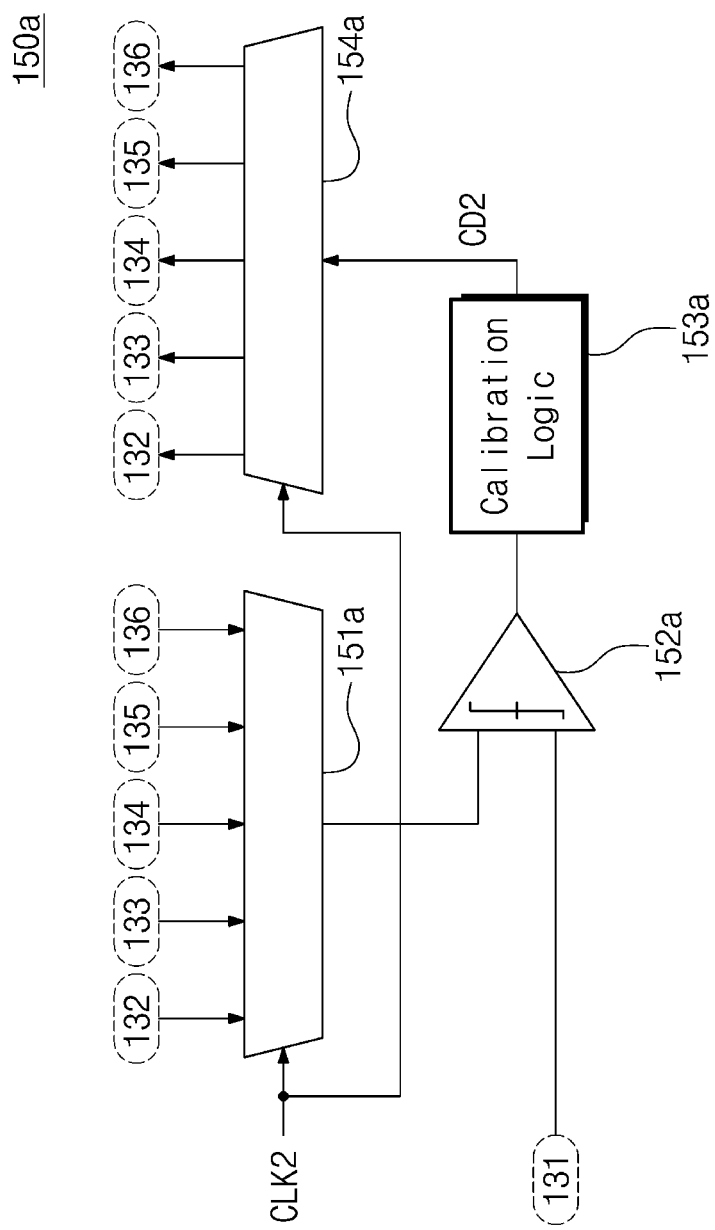
FIG. 3 illustrates a calibration circuit according to a second embodiment.

FIG. 3 illustrates a calibration circuit 150a according to a second example. Referring to FIGS. 1 and 3, the calibration circuit 150a may include a multiplexer 151a, a comparator 152a, a calibration logic circuit 153a, and a demultiplexer 154a.

The multiplexer 151a may receive output voltages of the second to sixth LDO regulators 132 to 136. The multiplexer 151a may receive the second clock signal CLK2. In response to the second clock signal CLK2, the multiplexer 151a may select the output voltages of the second to sixth LDO regulators 132 to 136 in turn. For example, the multiplexer 151a may select the output voltages of the second to sixth LDO regulators 132 to 136 sequentially (e.g., in a round robin manner). The multiplexer 151a may transfer a selected output voltage to the comparator 152a.

The comparator 152a may compare an output voltage transferred from the multiplexer 151a and an output voltage of the first LDO regulator 131. A comparison result of the comparator 152a may be transferred to the calibration logic circuit 153a. The calibration logic circuit 153a may generate the second digital code CD2 based on the comparison result of the comparator 152a. For example, the calibration logic circuit 153a may generate the second digital code CD2 based on a variety of information such as an output of the comparator 152a, an operating mode, previous outputs of the comparator 152a, a level of a selected output voltage, a level of an output voltage of the first LDO regulator 131, and the like. The second digital code CD2 may be transferred to the demultiplexer 154a.

The demultiplexer 154a may receive the second digital code CD2 from the calibration logic circuit 153a and may receive the second clock signal CLK2. The demultiplexer 154a may transfer the second digital code CD2 to one of the second to sixth LDO regulators 132 to 136 in response to the second clock signal CLK2. For example, the demultiplexer 154a may select the second to sixth LDO regulators 132 to 136 in turn or sequentially (e.g., in a round robin manner). The demultiplexer 154a may output the second digital code CD2 to a selected LDO regulator of the second to sixth LDO regulators 132 to 136.

In the case where the calibration circuit 150 of FIG. 1 is implemented as illustrated in FIG. 3, the calibration circuit 150 may not receive the feedback voltage VFB.

In an embodiment, a frequency of the first clock signal CLK1 may be the same as a frequency of the second clock signal CLK2. When the number of LDO regulators is "i" (i being a positive integer), the calibration circuit 150 may update the second digital code CD2 associated with a specific LDO regulator to be slower than the first digital code CD1.

For example, the first digital code CD1 associated with the specific LDO regulator may be updated every clock cycle of the first clock signal CLK1. In the calibration circuit 150 of FIG. 2, the second digital code CD2 associated with the specific LDO regulator may be updated whenever "i" clock cycles pass; in the calibration circuit 150a of FIG. 3, the second digital code CD2 associated with the specific LDO regulator may be updated whenever "i–1" clock cycles pass. Because an update period of the first digital code CD1 and an update period of the second digital code CD2 are different, there may be prevented an oscillation that happens when a change of an output voltage of a specific LDO regulator due to the first digital code CD1 and a change of the output voltage of the specific LDO regulator due to the second digital code CD2 overlap each other.

Figure 4:
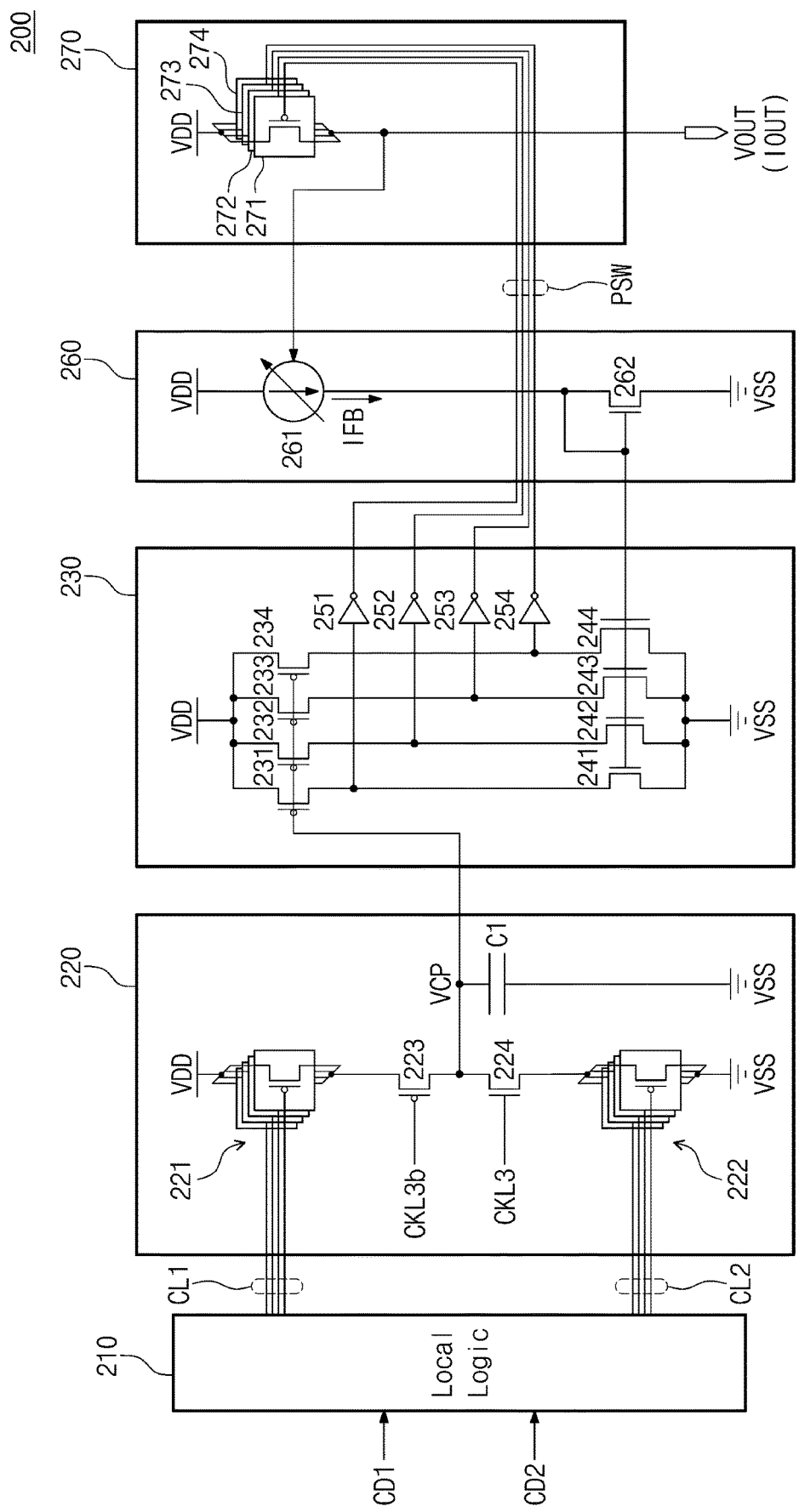
FIG. 4 illustrates an LDO regulator according to an embodiment of the present disclosure.

FIG. 4 illustrates an LDO regulator 200 according to an embodiment of the present disclosure. In an embodiment, the LDO regulator 200 may be included in one of the first to sixth LDO regulators 131 to 136.

Referring to FIGS. 1 and 4, the LDO regulator 200 may include a local logic circuit 210, a charge pump circuit 220, a local analog-to-digital converter circuit 230, a feedback circuit 260, and a power circuit 270.

The local logic circuit 210 may receive the first digital code CD1 and the second digital code CD2. The local logic circuit 210 may combine the first digital code CD1 and the second digital code CD2. For example, the local logic circuit 210 may add the first digital code CD1 and the second digital code CD2. The local logic circuit 210 may combine the first digital code CD1 and the second digital code CD2 such that a voltage difference indicated by the first digital code CD1 and a voltage difference indicated by the second digital code CD2 are reflected together. The local logic circuit 210 may control (or drive) voltages of first control lines CL1 or voltages of second control lines CL2, based on the combined result.

The charge pump circuit 220 may include first pump transistors 221, second pump transistors 222, a first pump control transistor 223, a second pump control transistor 224, and a first capacitor C1.

The first pump transistors 221 may be connected in parallel between a power node to which a power supply voltage VDD is applied and the first pump control transistor 223. Gates of the first pump transistors 221 may be respectively connected with the first control lines CL1. The first pump transistors 221 may output a current when the first pump control transistor 223 is turned on, and thus, a pump voltage VCP may increase.

The second pump transistors 222 may be connected in parallel between a ground node to which a ground voltage VSS is applied and the second pump control transistor 224. Gates of the second pump transistors 222 may be respectively connected with the second control lines CL2. The second pump transistors 222 may sink a current when the second pump control transistor 224 is turned on, and thus, the pump voltage VCP may decrease.

The first pump control transistor 223 may be connected between the first pump transistors 221 and the first capacitor C1. The first pump control transistor 223 may operate in response to a third inverted clock signal CLK3b. The second pump control transistor 224 may be connected between the second pump transistors 222 and the first capacitor C1. The second pump control transistor 224 may operate in response to a third clock signal CLK3.

The third clock signal CLK3 and the third inverted clock signal CLK3b may be complementary signals. When the third clock signal CLK3 is at a high level (e.g., a "logical high"), the third inverted clock signal CLK3b may be at a low level (e.g., a "logical low"). In this case, the first pump control transistor 223 and the second pump control transistor 224 may be turned on. The pump voltage VCP may be adjusted by a current output from the first pump transistors 221 and a current sunk by the second pump transistors 222.

When the third clock signal CLK3 is at the low level, the third inverted clock signal CLK3b may be at the high level. In this case, the first pump control transistor 223 and the second pump control transistor 224 may be turned off. When turned off, the first pump control transistor 223 and the second pump control transistor 224 may not influence the pump voltage VCP.

When the combined result of the first digital code CD1 and the second digital code CD2 indicates to increase an output voltage VOUT, the local logic circuit 210 may increase the number of pump transistors to be turned on from among the first pump transistors 221 or may decrease the number of pump transistors to be turned on from among the second pump transistors 222. That is, the pump voltage VCP may increase.

When the combined result of the first digital code CD1 and the second digital code CD2 indicates to decrease the output voltage VOUT, the local logic circuit 210 may increase the number of pump transistors to be turned off from among the first pump transistors 221 or may decrease the number of pump transistors to be turned off from among the second pump transistors 222. That is, the pump voltage VCP may decrease.

When the combined result of the first digital code CD1 and the second digital code CD2 indicates to maintain the output voltage VOUT, the local logic circuit 210 may turn off both the first pump transistors 221 and the second pump transistors 222.

The pump voltage VCP is adjusted based on the first digital code CD1 and the second digital code CD2. Accordingly, the pump voltage VCP may be regarded as generated at the LDO regulator 200 but included in the global control loop. The pump voltage VCP may be adjusted based on a period where the first digital code CD1 is updated, that is, a period of the first clock signal CLK1.

The local analog-to-digital converter circuit 230 may receive the pump voltage VCP, may receive a feedback current IFB from the feedback circuit 260, and may generate a switch code PSW in response to the pump voltage VCP and the feedback current IFB. The local analog-to-digital converter circuit 230 may control the output voltage VOUT of the power circuit 270 by using the switch code PSW.

The local analog-to-digital converter circuit 230 may include first to fourth up transistors 231 to 234, first to fourth down transistors 241 to 244, and first to fourth inverters 251 to 254.

The first to fourth up transistors 231 to 234 may be connected between the power node to which the power supply voltage VDD is applied and the first to fourth down transistors 241 to 244, respectively. Gates of the first to fourth up transistors 231 to 234 may in common receive the pump voltage VCP. The first to fourth up transistors 231 to 234 may output up currents IUP (refer to FIGS. 5, 6, 7, and 8) in response to the pump voltage VCP.

For example, to allow for clarity in the figures, unless otherwise specified, an up current that the first up transistor 231 generates may be a first up current IUP_231. An up current that the second up transistor 232 generates may be a second up current IUP_232. An up current that the third up transistor 233 generates may be a third up current IUP_233. An up current that the fourth up transistor 234 generates may be a fourth up current IUP_234. The amounts of first to fourth up currents IUP_231 to IUP_234 may be the same.

The first to fourth down transistors 241 to 244 may mirror the feedback current IFB to sink down currents IDN (refer to FIGS. 5, 6, 7, and 8). The first to fourth down transistors 241 to 244 may mirror the feedback current IFB to generate the down currents IDN of different amounts.

For example, to allow for clarity in the figures, unless otherwise specified, a down current that the first down transistor 241 generates may be a first down current IDN_241. A down current that the second down transistor 242 generates may be a second down current IDN_242. A down current that the third down transistor 243 generates may be a third down current IDN_243. A down current that the fourth down transistor 244 generates may be a fourth down current IDN_244.

The amount of second down current IDN_242 may be two times the amount of first down current IDN_241. The amount of third down current IDN_243 may be three times the amount of first down current IDN_241. The amount of fourth down current IDN_244 may be four times the amount of first down current IDN_241.

In an embodiment, the down currents IDN may include a first down current to an n-th down current (n being a positive integer more than "1"). The amount of k-th down current (k being a positive integer more than "1" and equal to or less than "n") of the first down current to the n-th down current may be k times the amount of first down current.

For example, sizes of the first to fourth down transistors 241 to 244 may be different. The size of the second down transistor 242 may be two times the size of the first down transistor 241. The size of the third down transistor 243 may be three times the size of the first down transistor 241. The size of the fourth down transistor 244 may be four times the size of the first down transistor 241. The amount of current flowing through a down transistor may be determined by a size of the down transistor. For example, the size of the down transistor may correspond to a width (or a cross-sectional area) of a channel of the down transistor.

In an embodiment, down transistors may include a first down transistor to an n-th down transistor (n being a positive integer more than "1"). The amount of k-th down transistor (k being a positive integer more than "1" and equal to or less than "n") of the first down transistor to the n-th down transistor may be k times the size of the first down transistor.

An output of the first inverter 251 may be determined by the amount of current output from the first up transistor 231 and the amount of current sunk by the first down transistor 241. When an input voltage of the first inverter 251 is smaller than a threshold voltage of the first inverter 251, the first inverter 251 may output the high level. When the input voltage of the first inverter 251 is equal to or greater than the threshold voltage of the first inverter 251, the first inverter 251 may output the low level.

An output of the second inverter 252 may be determined by the amount of current output from the second up transistor 232 and the amount of current sunk by the second down transistor 242. When an input voltage of the second inverter 252 is smaller than a threshold voltage of the second inverter 252, the second inverter 252 may output the high level. When the input voltage of the second inverter 252 is equal to or greater than the threshold voltage of the second inverter 252, the second inverter 252 may output the low level.

An output of the third inverter 253 may be determined by the amount of current output from the third up transistor 233 and the amount of current sunk by the third down transistor 243. When an input voltage of the third inverter 253 is smaller than a threshold voltage of the third inverter 253, the third inverter 253 may output the high level. When the input voltage of the third inverter 253 is equal to or greater than the threshold voltage of the third inverter 253, the third inverter 253 may output the low level.

An output of the fourth inverter 254 may be determined by the amount of current output from the fourth up transistor 234 and the amount of current sunk by the fourth down transistor 244. When an input voltage of the fourth inverter 254 is smaller than a threshold voltage of the fourth inverter 254, the fourth inverter 254 may output the high level. When the input voltage of the fourth inverter 254 is equal to or greater than the threshold voltage of the fourth inverter 254, the fourth inverter 254 may output the low level.

The local analog-to-digital converter circuit 230 may be regarded as a current mirror-based flash ADC in that the first to fourth down transistors 241 to 244 mirror the feedback current IFB and the first to fourth inverters 251 to 254 simultaneously output the switch code PSW.

The feedback circuit 260 may output the feedback current IFB based on the output voltage VOUT of the LDO regulator 200. The feedback circuit 260 may include a variable current source 261 and a mirror transistor 262.

The variable current source 261 may adjust the amount of the feedback current IFB based on the output voltage VOUT. When the output voltage VOUT increases, the variable current source 261 may increase the amount of the feedback current IFB. When the output voltage VOUT decreases, the variable current source 261 may decrease the amount of the feedback current IFB. The mirror transistor 262 may mirror the feedback current IFB so as to be transferred to the local analog-to-digital converter circuit 230.

The power circuit 270 may include first to fourth power transistors 271 to 274 connected in parallel between an output node and the power node to which the power supply voltage VDD is applied. Gates of the first to fourth power transistors 271 to 274 may be driven by the switch code PSW.

The gate of the first power transistor 271 may be driven by an output of the first inverter 251. The gate of the second power transistor 272 may be driven by an output of the second inverter 252. The gate of the third power transistor 273 may be driven by an output of the third inverter 253. The gate of the fourth power transistor 274 may be driven by an output of the fourth inverter 254.

When each of the first to fourth power transistors 271 to 274 is turned on, each of the first to fourth power transistors 271 to 274 may output a current of the same amount. Currents output from power transistors turned on from among the first to fourth power transistors 271 to 274 may be merged to an output current IOUT.

The output current IOUT may be different from a load current. When the load current is greater than the output current IOUT, the output voltage VOUT may decrease. When the load current is smaller than the output current IOUT, the output voltage VOUT may increase. The feedback circuit 260 may transfer a change of the output voltage VOUT to the local analog-to-digital converter circuit 230 in the form of the feedback current IFB. The local analog-todigital converter circuit 230 may drive the first to fourth power transistors 271 to 274 in response to the change of the feedback current IFB. That is, as the output current IOUT follows a change of the load current, a change of the output voltage VOUT may be restored.

The local analog-to-digital converter circuit 230, the feedback circuit 260, and the power circuit 270 may form a local control loop. The local control loop may maintain the output voltage VOUT as a target output voltage. The local control loop may restore the output voltage VOUT changed due to a change of the load current. When the pump voltage VCP changes due to a change of the target output voltage, the local control loop may adjust the output voltage VOUT to a new target output voltage.

Figure 5:
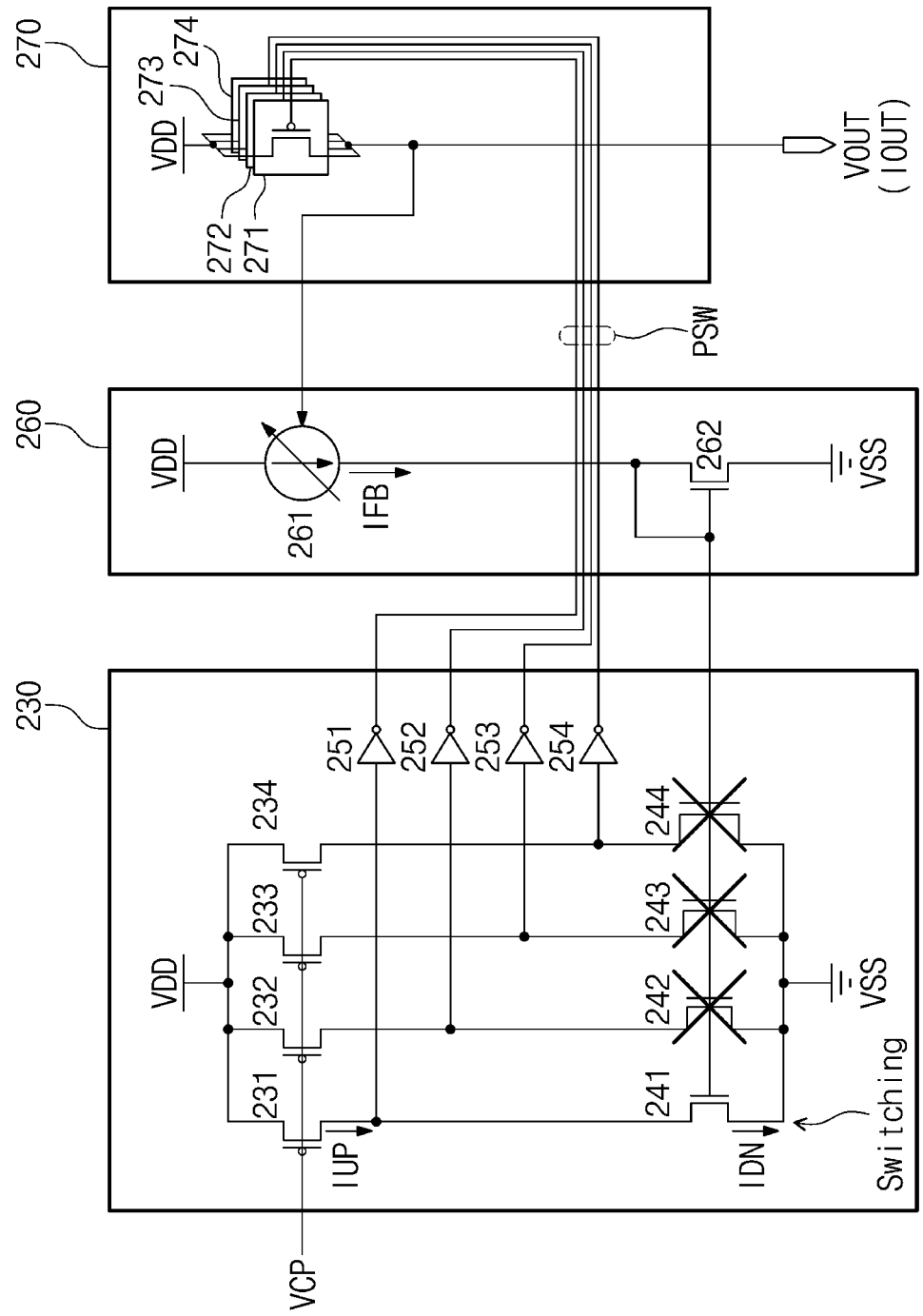
FIG. 5 illustrates an example in which a local control loop operates when the amount of load current is smaller than a current amount of one power transistor.

FIG. 5 illustrates an example in which a local control loop operates when the amount of load current is smaller than a current amount of one power transistor. Referring to FIGS. 1, 4, and 5, the first power transistor 271 may be in a switching state. When the first power transistor 271 is turned on, the first power transistor 271 may output a current larger than a load current as the output current IOUT. Accordingly, the output voltage VOUT may increase.

As the output voltage VOUT increases, the feedback current IFB may increase. As the feedback current IFB increases, the first down current IDN_241 may increase. When the first down current IDN_241 is greater than the first up current IUP_231, an input voltage of the first inverter 251 may decrease, and an output of the first inverter 251 may transition to the high level. As the output of the first inverter 251 transitions to the high level, the first power transistor 271 may be turned off.

When the first power transistor 271 is turned off, and no current may flow through the first power transistor 271. Accordingly, the output voltage VOUT may decrease. As the output voltage VOUT decreases, the feedback current IFB may decrease, and the first down current IDN_241 may decrease. When the first down current IDN_241 is smaller than the first up current IUP_231, the input voltage of the first inverter 251 may increase, and the output of the first inverter 251 may transition to the low level. Accordingly, the first power transistor 271 may be turned on, and current may flow through the first power transistor 271.

The first power transistor 271 may adjust the output voltage VOUT and the output current IOUT in the switching state where the first power transistor 271 repeatedly transitions between turned-on (e.g., an on state) and turned-off (e.g., an off state). A length of a switching period including one turn-on and one turn-off (e.g., the on state and the off state) may be determined depending on an internal delay of a local control loop.

As a load current increases, a duty cycle of the first power transistor 271 may decrease. The duty cycle may correspond to a ratio of a time period, in which the first inverter 251 has the high level (i.e., a time period where the first power transistor 271 is turned off), to the total length of a switching period. That is, as the load current increases, in the switching period, a time period where the first power transistor 271 is turned on may increase, and a time period where the first power transistor 271 is turned off may decrease.

As a load current decreases, the duty cycle of the first power transistor 271 may increase. That is, as the load current decreases, in the switching period, the time period where the first power transistor 271 is turned on may decrease, and the time period where the first power transistor 271 is turned off may increase.

The amount of the feedback current IFB causing the increase and decrease of the input voltage of the first inverter 251 may be similar to the amount of the first down current IDN_241. As described above, because the amounts of down currents flowing through the second to fourth down transistors 242 to 244 are two or more times the amount of the first down current IDN_241, input voltages of the second to fourth inverters 252 to 254 may be maintained at a low voltage, and thus, outputs of the second to fourth inverters 252 to 254 may be set to the high level. As such, the second to fourth power transistors 272 to 274 may maintain a turned-off state.

When a load current does not exist, the input voltage of the first inverter 251 may be close to the ground voltage VSS and may be maintained to be lower than the threshold voltage of the first inverter 251. As such, during the switching period, the output of the first inverter 251 may maintain the high level, and the first power transistor 271 may maintain the turned-off state. That is, the first power transistor 271 may have a duty cycle of 100%.

When the amount of load current is the same as the amount of current that one power transistor outputs, the input voltage of the first inverter 251 may be close to the power supply voltage VDD and may be maintained to be higher than the threshold voltage of the first inverter 251. As such, during the switching period, the output of the first inverter 251 may maintain the low level, and the first power transistor 271 may maintain a turned-on state. That is, the first power transistor 271 may have a duty cycle of 0%.

In an embodiment, because the switching of the first power transistor 271 is caused by a change in a voltage of a node between the first up transistor 231 and the first down transistor 241, "switching" is marked adjacent to the first down transistor 241 in FIG. 5.

Figure 6:
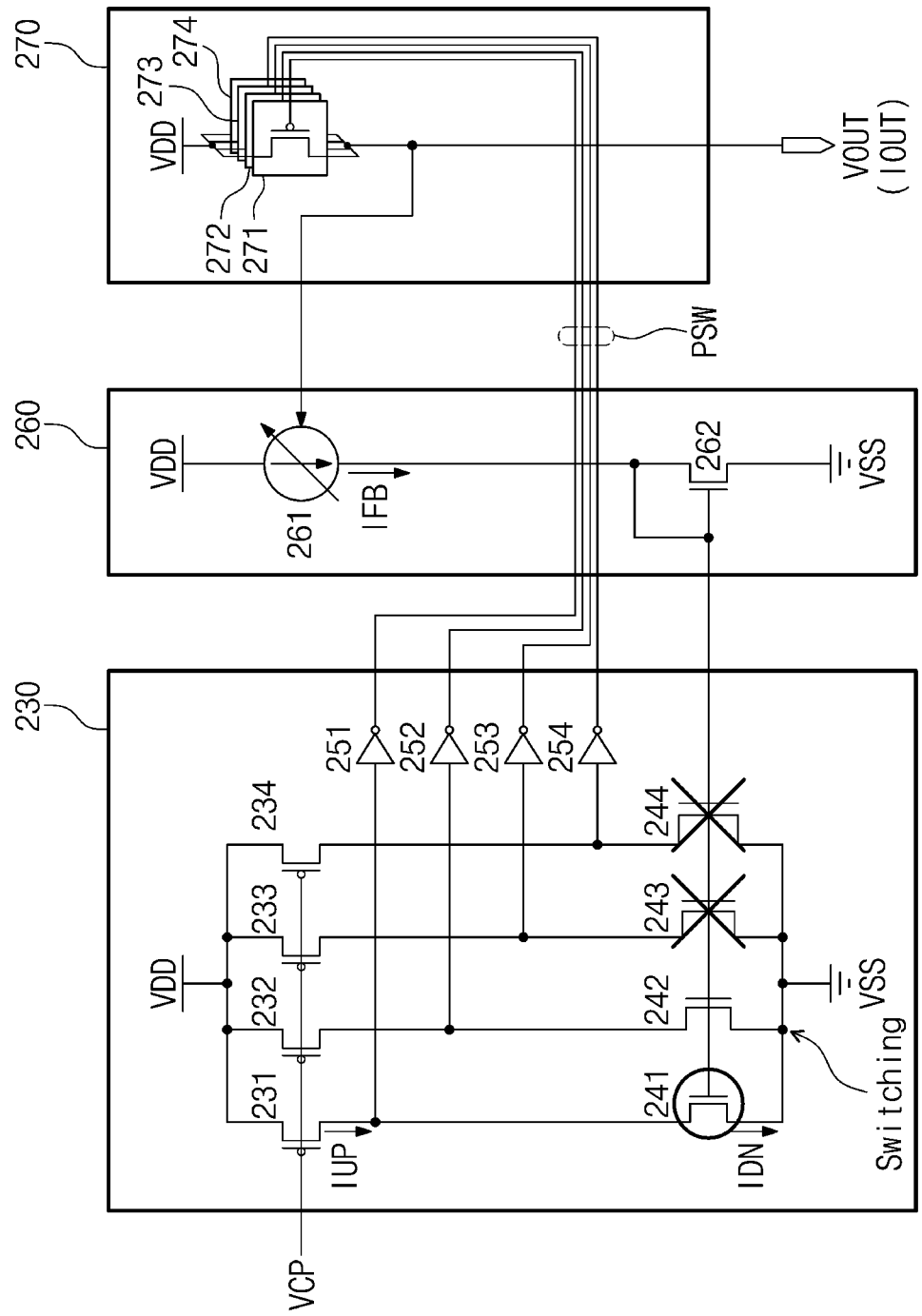
FIG. 6 illustrates an example in which a local control loop operates when the amount of load current is larger than a current amount of one power transistor and is smaller than a current amount of two power transistors.

FIG. 6 illustrates an example in which a local control loop operates when the amount of load current is larger than a current amount of one power transistor and is smaller than a current amount of two power transistors. Referring to FIGS. 1, 4, and 6, the first power transistor 271 may maintain the turned-on state, and the second power transistor 272 may be in the switching state. In this case, the second up transistor 232, the second down transistor 242, the second up current IUP_232, the second down current IDN_242, the second inverter 252, and the second power transistor 272 may operate in the switching state that is described with reference to the first up transistor 231, the first down transistor 241, the first up current IUP_231, the first down current IDN_241, the first inverter 251, and the first power transistor 271 of FIG. 4. Thus, additional description will be omitted to avoid redundancy.

As described with reference to FIG. 5, the third up current IUP_233 and the fourth up current IUP_234 are smaller than the third down current IDN_243 and the fourth down current IDN_244. Accordingly, outputs of the third inverter 253 and the fourth inverter 254 may be set to the high level, and the third power transistor 273 and the fourth power transistor 274 may maintain the turned-off state.

In the case where the amount of load current is the same as the amount of current that one power transistor outputs, the input voltage of the second inverter 252 may be close to the ground voltage VSS and may be maintained to be lower than the threshold voltage of the second inverter 252. As such, during the switching period, the output of the second inverter 252 may maintain the high level, and the second power transistor 272 may maintain the turned-off state. That is, the second power transistor 272 may have a duty cycle of 100%.

When the amount of load current is the same as the amount of current that two power transistors output, the input voltage of the second inverter 252 may be close to the power supply voltage VDD and may be maintained to be higher than the threshold voltage of the second inverter 252. As such, during the switching period, the output of the second inverter 252 may maintain the low level, and the second power transistor 272 may maintain the turned-on state. That is, the second power transistor 272 may have a duty cycle of 0%.

In an embodiment, because the switching of the second power transistor 272 is caused by a change in a voltage of a node between the second up transistor 232 and the second down transistor 242, "switching" is marked adjacent to the second down transistor 242 in FIG. 6.

Figure 7:
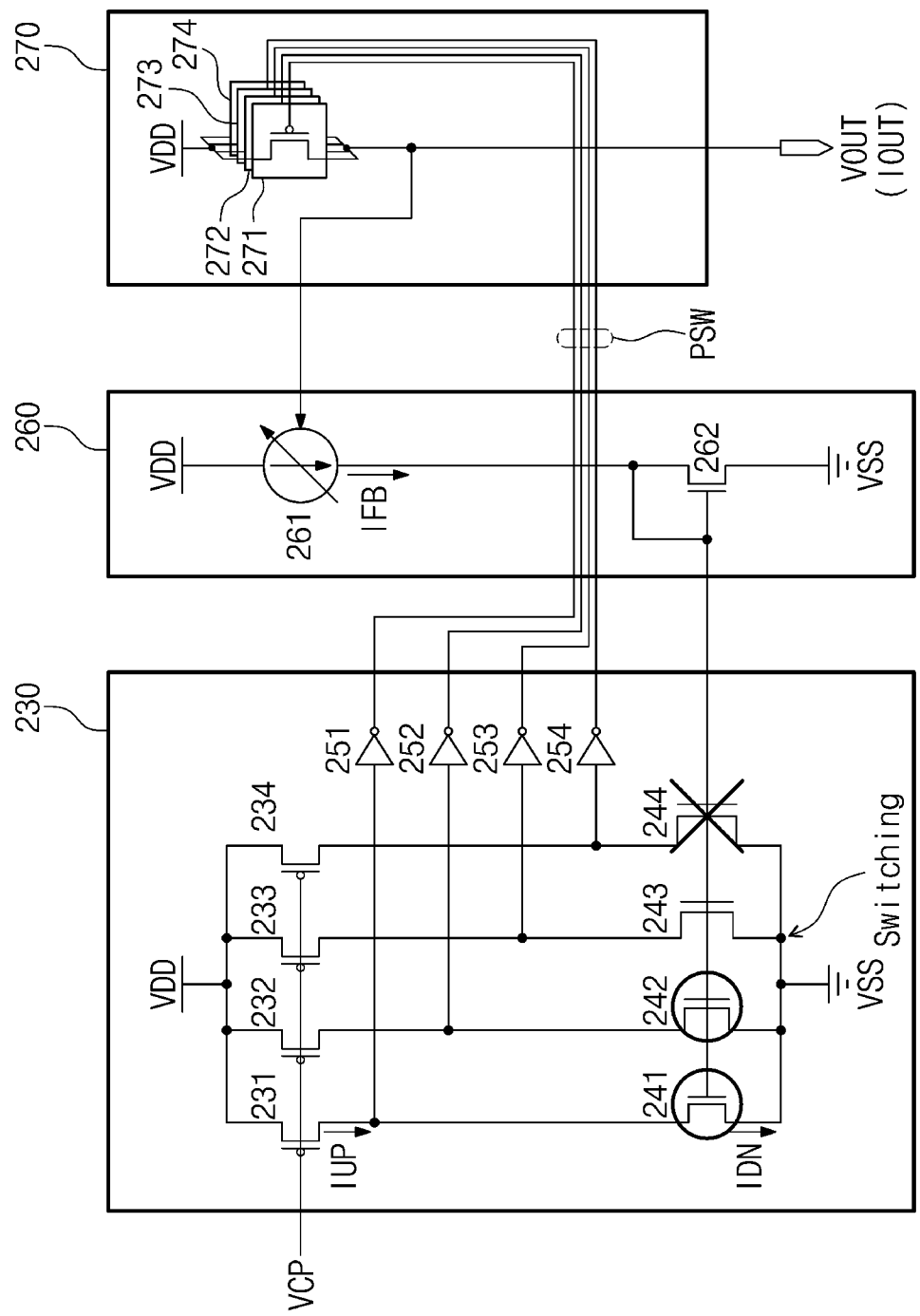
FIG. 7 illustrates an example in which a local control loop operates when the amount of load current is larger than a current amount of two power transistors and is smaller than a current amount of three power transistors.

FIG. 7 illustrates an example in which a local control loop operates when the amount of load current is larger than a current amount of two power transistors and is smaller than a current amount of three power transistors. Referring to FIGS. 1, 4, and 7, the first and second power transistors 271 and 272 may maintain the turned-on state, and the third power transistor 273 may be in the switching state. In this case, the third up transistor 233, the third down transistor 243, the third up current IUP_233, the third down current IDN_243, the third inverter 253, and the third power transistor 273 may operate in the switching state that is described with reference to the first up transistor 231, the first down transistor 241, the first up current IUP_231, the first down current IDN_241, the first inverter 251, and the first power transistor 271 of FIG. 4. Thus, additional description will be omitted to avoid redundancy.

As described with reference to FIG. 5, the fourth up current IUP_234 is smaller than the fourth down current IDN_244. Accordingly, an output of the fourth inverter 254 may be set to the high level, and the fourth power transistor 274 may maintain the turned-off state.

In the case where the amount of load current is the same as the amount of current that two power transistor outputs, the input voltage of the third inverter 253 may be close to the ground voltage VSS and may be maintained to be lower than the threshold voltage of the third inverter 253. As such, during the switching period, the output of the third inverter 253 may maintain the high level, and the third power transistor 273 may maintain the turned-off state. That is, the third power transistor 273 may have a duty cycle of 100%.

When the amount of load current is the same as the amount of current that three power transistors output, the input voltage of the third inverter 253 may be close to the power supply voltage VDD and may be maintained to be higher than the threshold voltage of the third inverter 253. As such, during the switching period, the output of the third inverter 253 may maintain the low level, and the third power transistor 273 may maintain the turned-on state. That is, the third power transistor 273 may have a duty cycle of 0%.

In an embodiment, because the switching of the third power transistor 273 is caused by a change in a voltage of a node between the third up transistor 233 and the third down transistor 243, "switching" is marked adjacent to the third down transistor 243 in FIG. 7.

Figure 8:
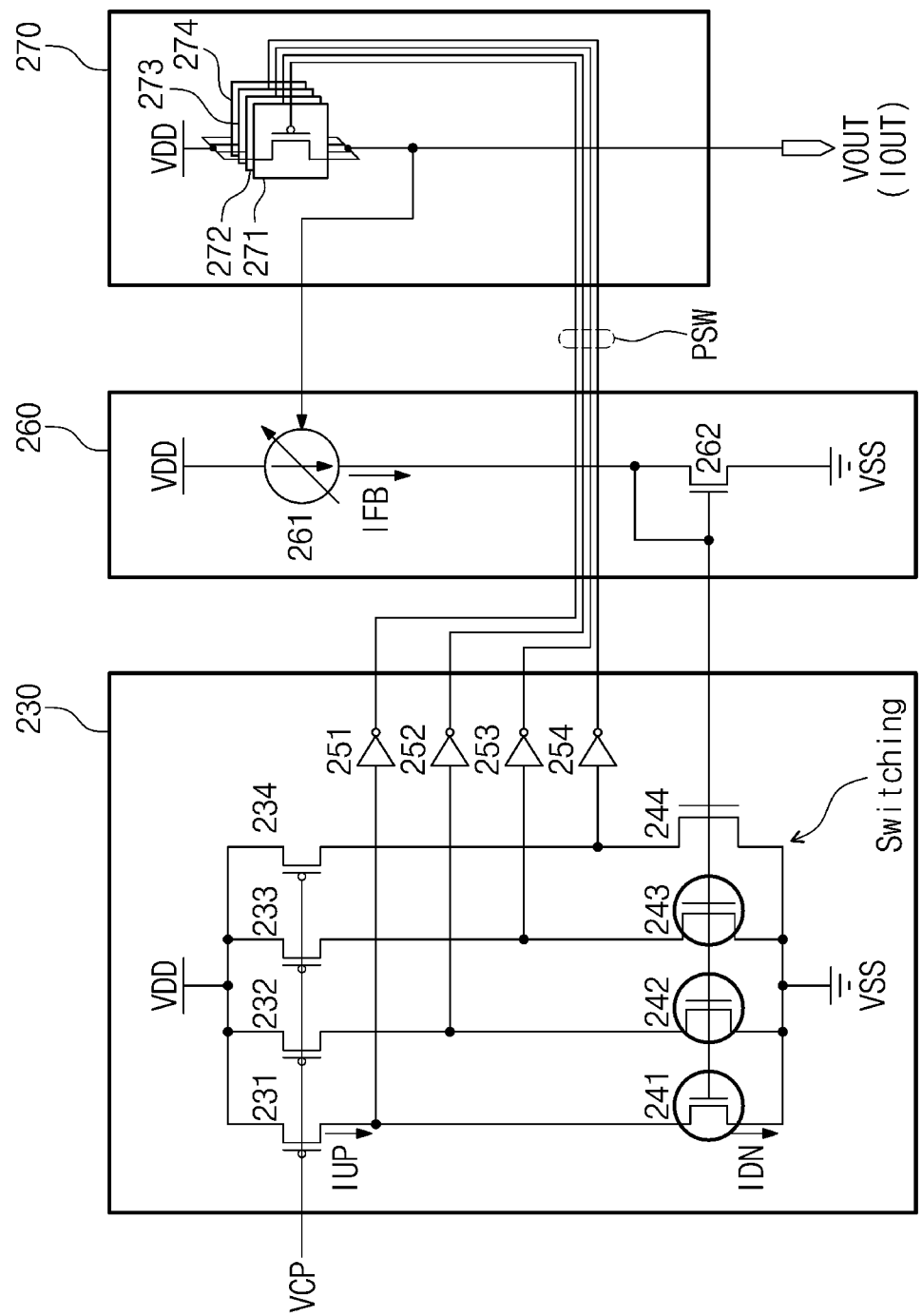
FIG. 8 illustrates an example in which a local control loop operates when the amount of load current is larger than a current amount of three power transistors and is smaller than a current amount of four power transistors.

FIG. 8 illustrates an example in which a local control loop operates when the amount of load current is larger than a current amount of three power transistors and is smaller than a current amount of four power transistors. Referring to FIGS. 1, 4, and 8, the first to third power transistors 271, 272, and 273 may maintain the turned-on state, and the fourth power transistor 274 may be in the switching state. In this case, the fourth up transistor 234, the fourth down transistor 244, the fourth up current IUP_234, the fourth down current IDN_244, the fourth inverter 254, and the fourth power transistor 274 may operate in the switching state that is described with reference to the first up transistor 231, the first down transistor 241, the first up current IUP_231, the first down current IDN_241, the first inverter 251, and the first power transistor 271 of FIG. 4. Thus, additional description will be omitted to avoid redundancy.

In the case where the amount of load current is the same as the amount of current that three power transistor outputs, the input voltage of the fourth inverter 254 may be close to the ground voltage VSS and may be maintained to be lower than the threshold voltage of the fourth inverter 254. As such, during the switching period, the output of the fourth inverter 254 may maintain the high level, and the fourth power transistor 274 may maintain the turned-off state. That is, the fourth power transistor 274 may have a duty cycle of 100%.

When the amount of load current is the same as the amount of current that four power transistors output, the input voltage of the fourth inverter 254 may be close to the power supply voltage VDD and may be maintained to be higher than the threshold voltage of the fourth inverter 254. As such, during the switching period, the output of the fourth inverter 254 may maintain the low level, and the fourth power transistor 274 may maintain the turned-on state. That is, the fourth power transistor 274 may have a duty cycle of 0%.

In an embodiment, because the switching of the fourth power transistor 274 is caused by a change in a voltage of a node between the fourth up transistor 234 and the fourth down transistor 244, "switching" is marked adjacent to the fourth down transistor 244 in FIG. 8.

As described above, one of power transistors of an electronic device according to an embodiment of the present disclosure may be in the switching state, and each of the remaining power transistors may be in the turned-on state or the turned-off state. A duty cycle of a power transistor in the switching state may be fully used within a range from 0% to 100%. Accordingly, the efficiency of the power transistors 271 to 274 is improved.

Figures 9, 10:
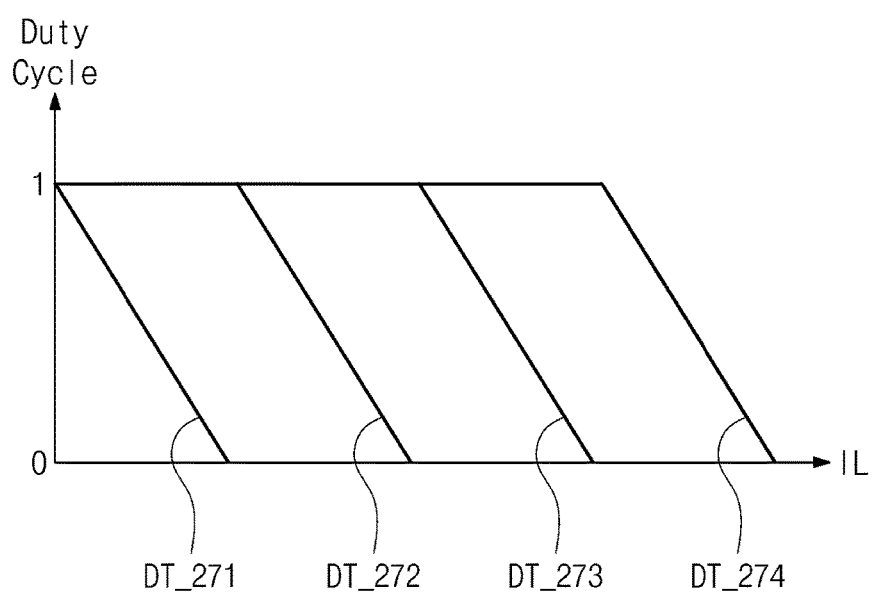
FIG. 9 illustrates an example in which first to fourth power transistors are driven depending on a load current.
FIG. 10 illustrates duty cycles of power transistors when a load current increases.

FIG. 9 illustrates an example in which the first to fourth power transistors 271 to 274 are driven depending on a load current IL. Referring to FIGS. 1, 4, and 9, as the load current IL becomes smaller (or a load becomes lighter), the number of power transistors in the turned-off state increases. In response to that, a duty cycle of a power transistor in the switching state becomes 100% as the load current IL decreases, the power transistor in the switching state may be turned off, and a power transistor in the turned-on state may become the switching state. At least one power transistor may be in the switching state (even though having a duty cycle of 0% or 100%).

As the load current IL becomes larger (or a load becomes heavier), the number of power transistors in the turned-on state increases. In response to that, a duty cycle of a power transistor in the switching state becomes 0% as the load current IL increases, the power transistor in the switching state may be turned on, and a power transistor in the turned-off state may become the switching state. At least one power transistor may be in the switching state (even though having a duty cycle of 0% or 100%).

A state change of each of the first to fourth power transistors 271 to 274 may be made within the local control loop. Accordingly, state changes of the first to fourth power transistors 271 to 274 may be made depending on an operating frequency of the local control loop and are possible to be faster than a state change made by an external control.

In an embodiment, the global control loop may operate based on the first clock signal CLK1. An operating frequency of the global control loop may be several MHz. The local control loop may operate based on a length of a switching period. The length of the switching period may be determined by an internal delay of the local control loop. In an embodiment, an operating frequency of the local control loop may be ten MHz.

FIG. 10 illustrates duty cycles of the power transistors 271 to 274 when the load current IL increases. Referring to FIGS. 1, 4, and 10, when there is no load current IL, duty cycles DT_271 to DT_274 of the first to fourth power transistors 271 to 274 may be "1", that is, 100%.

As the load current IL linearly increases, the duty cycle DT_271 of the first power transistor 271 may linearly decrease. When the duty cycle DT_271 of the first power transistor 271 is "0", that is, 0%, the duty cycle DT_272 of the second power transistor 272 may start to decrease.

As the load current IL linearly increases, the duty cycle DT_272 of the second power transistor 272 may linearly decrease. When the duty cycle DT_272 of the second power transistor 272 is "0", that is, 0%, the duty cycle DT_273 of the third power transistor 273 may start to decrease.

As the load current IL linearly increases, the duty cycle DT_273 of the third power transistor 273 may linearly decrease. When the duty cycle DT_273 of the third power transistor 273 is "0", that is, 0%, the duty cycle DT_274 of the fourth power transistor 274 may start to decrease.

As the load current IL linearly increases, the duty cycle DT_274 of the fourth power transistor 274 may linearly decrease. The duty cycle DT_274 of the fourth power transistor 274 may decrease to "0", that is, 0%.

Figure 11:
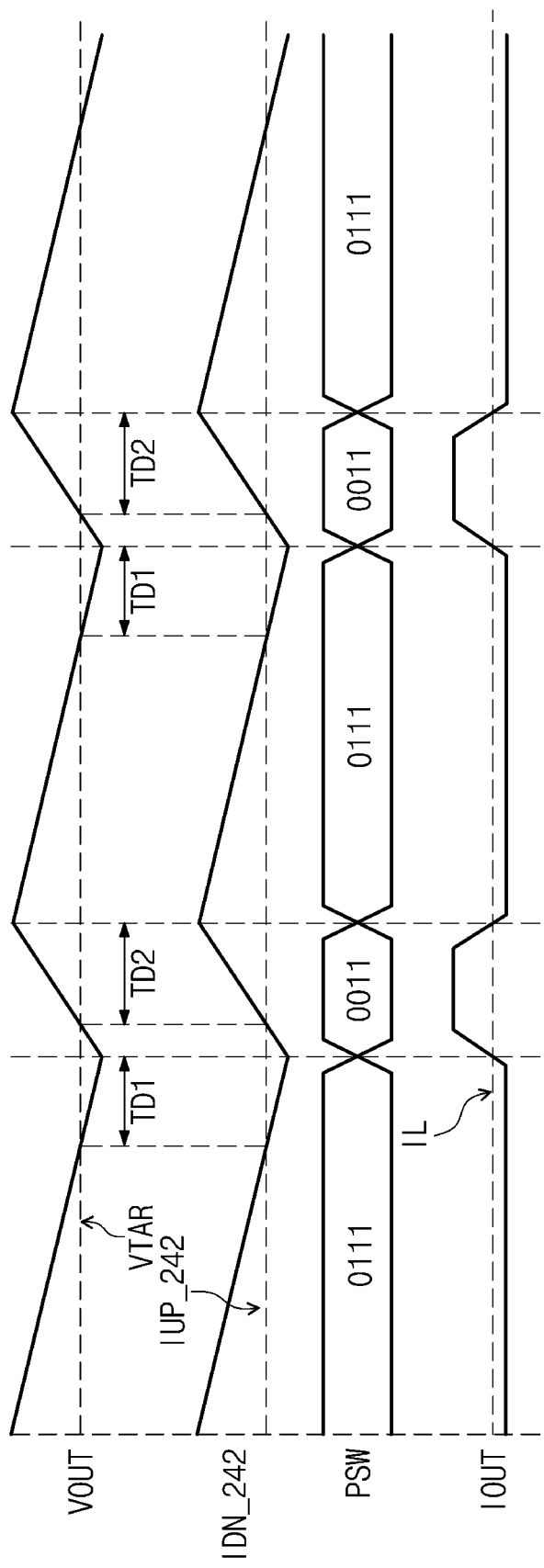
FIG. 11 illustrates waveforms of signals of a local control loop when a second power transistor switches.

FIG. 11 illustrates waveforms of signals of the local control loop when the second power transistor 272 switches. Referring to FIGS. 1, 4, and 11, waveforms of the output voltage VOUT, the second down current IDN_242, the switch code PSW, and the output current IOUT are depicted.

A dotted line associated with the output voltage VOUT indicates a target output voltage VTAR. A dotted line associated with the second down current IDN_242 indicates the second up current IUP_242. A dotted line associated with the output current IOUT indicates the load current IL.

When the output voltage VOUT is greater than the target output voltage VTAR, the second power transistor 272 may be turned off by the second bit of the switch code PSW. As the output voltage VOUT decreases, the second down current IDN_242 may also decrease. When the output voltage VOUT is smaller than the target output voltage VTAR, the second down current IDN_242 may also be smaller than the second up current IUP_242. Accordingly, an input voltage of the second inverter 252 may start to increase.

A first time delay TD1 may include a time taken for the input voltage of the second inverter 252 to become greater than a threshold voltage of the second inverter 252. When the input voltage of the second inverter 252 is greater than the threshold voltage of the second inverter 252, the second bit of the switch code PSW may transition to the low level. As such, the second power transistor 272 may be turned on, and thus, the output current IOUT may increase.

As the output voltage VOUT increases, the second down current IDN_242 may increase. When the output voltage VOUT is greater than the target output voltage VTAR, the second down current IDN_242 may also be larger than the second up current IUP_232. Accordingly, the input voltage of the second inverter 252 may start to decrease.

A second time delay TD2 may include a time taken for the input voltage of the second inverter 252 to become smaller than the threshold voltage of the second inverter 252. When the input voltage of the second inverter 252 is smaller than the threshold voltage of the second inverter 252, the second bit of the switch code PSW may transition to the high level. As such, the second power transistor 272 may be turned off, and thus, the output current IOUT may decrease.

Figure 12:
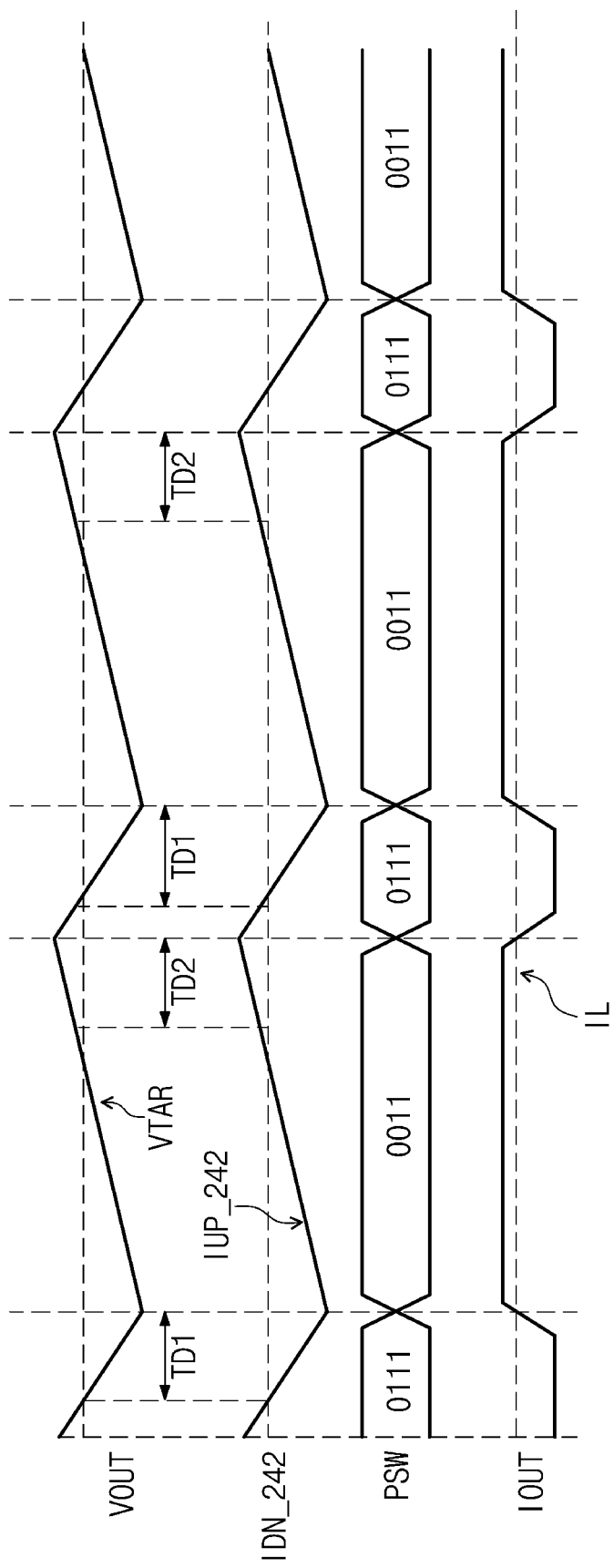
FIG. 12 illustrates waveforms of signals of a local control loop when a second power transistor switches.

FIG. 12 illustrates waveforms of signals of the local control loop when the second power transistor 272 switches. In an embodiment, FIG. 12 shows an example where the load current IL is larger than the load current IL described with reference to FIG. 11. Referring to FIGS. 1, 4, and 12, waveforms of the output voltage VOUT, the second down current IDN_242, the switch code PSW, and the output current IOUT are depicted.

A dotted line associated with the output voltage VOUT indicates a target output voltage VTAR. A dotted line associated with the second down current IDN_242 indicates the second up current IUP_242. A dotted line associated with the output current IOUT indicates the load current IL.

The waveforms of FIG. 12 may be interpreted the same as those described with reference to FIG. 11 except that a time during which the second power transistor 272 is turned on increases and a time during which the second power transistor 272 is turned off decreases. Thus, additional description will be omitted to avoid redundancy.

Figure 13:
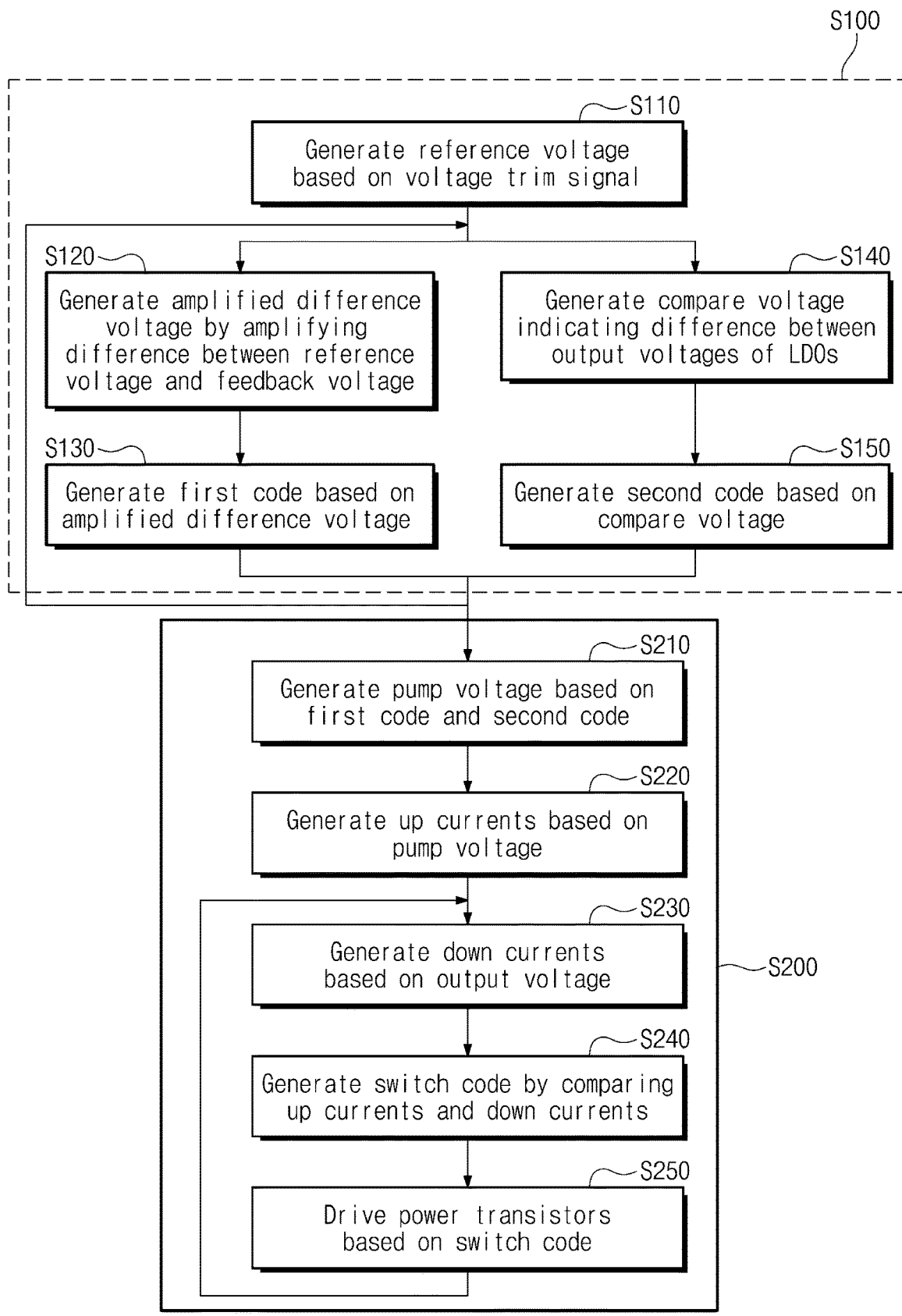
FIG. 13 illustrates an operating method of an electronic device according to an embodiment of the present disclosure.

FIG. 13 illustrates an operating method of the electronic device 100 according to an embodiment of the present disclosure. Referring to FIGS. 1, 2, 3, 4, and 13, operation S100 may be performed by the global logic circuit 140 and the calibration circuit 150, and operation S200 may be performed by the LDO regulator 200. In operation S110, the voltage generator 141 may generate a reference voltage VREF in response to the voltage trim signal VAS.

In operation S120, the amplifier 142 may generate the amplified difference voltage VAD by amplifying a difference between the reference voltage VREF and the feedback voltage VFB. In operation S130, the analog-to-digital converter 143 may generate the first digital code CD1 based on the amplified difference voltage VAD.

In operation S140, the comparator 152 or 152a may generate a comparison voltage indicating a difference between output voltages of the LDO regulators 131 to 136. In operation S150, the calibration logic circuit 153 or 153a may generate the second digital code CD2 based on the compensation voltage.

Operation S120 and operation S130 may be performed in parallel with operation S140 and operation S150. Operation S120 and operation S130 may be performed by the global logic circuit 140, based on the first clock signal CLK1. Operation S140 and operation S150 may be performed by the calibration circuit 150, based on the second clock signal CLK2. The first digital code CD1 and the second digital code CD2 may be transferred to the LDO regulator 200.

In operation S210, the charge pump circuit 220 may generate the pump voltage VCP based on the first digital code CD1 and the second digital code CD2. In operation S220, the local analog-to-digital converter circuit 230 may generate up currents IUP based on the pump voltage VCP. In operation S230, the local analog-to-digital converter circuit 230 may generate down currents IDN based on the output voltage VOUT.

In operation S240, the local analog-to-digital converter circuit 230 may generate the switch code PSW by comparing the up currents IUP and the down currents IDN. In operation S250, the local analog-to-digital converter circuit 230 may drive the power transistors 271 to 274 based on the switch code PSW.

Operation S110 may determine a level of a target output voltage by determining a level of the reference voltage VREF. Operation S120 to operation S150 may form the global control loop of adjusting the first digital code CD1 and the second digital code CD2 such that the feedback voltage VFB is the same as the target output voltage. The global control loop may be repeated.

Operation S210 and operation S220 may convert the first digital code CD1 and the second digital code CD2 output from the global control loop to a parameter necessary for the local control loop, that is, the pump voltage VCP and the up currents IUP. Operation S230 to operation S250 may be the local control loop of controlling the power transistors 271 to 274 such that the output voltage VOUT of the local LDO regulator is the same as the target output voltage. The local control loop may be repeated.

The electronic device 100 according to an embodiment of the present disclosure may adjust a voltage of the power rail 120 to a target output voltage more accurately and more quickly, by using the global control loop and the local control loop.

Figure 14:
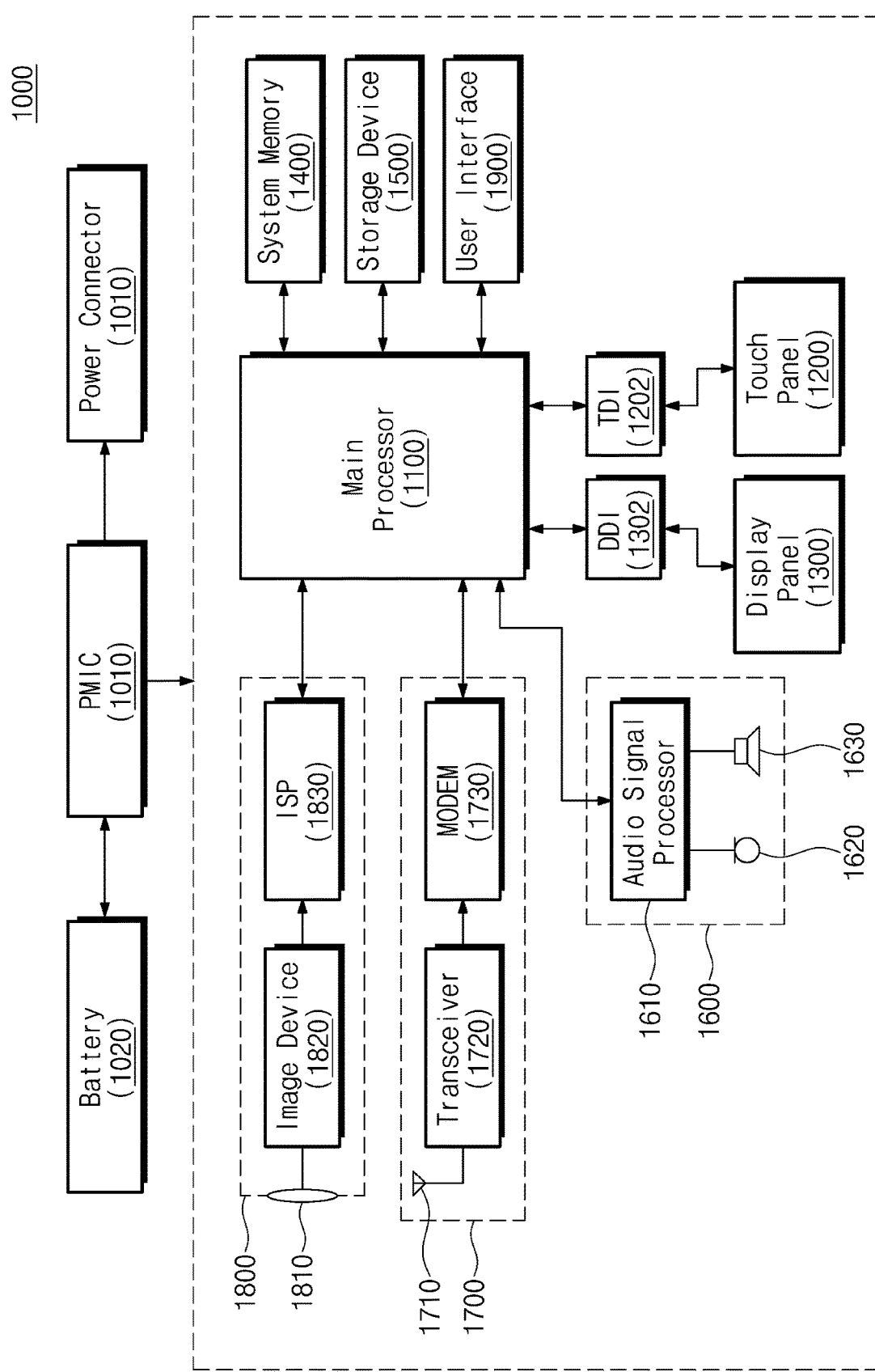
FIG. 14 illustrates an example of an electronic device according to another embodiment of the present disclosure.

FIG. 14 illustrates an example of an electronic device 1000 according to another embodiment of the present disclosure. Referring to FIG. 14, the electronic device 1000 may include a main processor 1100, a touch panel 1200, a touch driver integrated circuit (TDI) 1202, a display panel 1300, a display driver integrated circuit (DDI) 1302, a system memory 1400, a storage device 1500, an audio processor 1600, a communication block 1700, an image processor 1800, and a user interface 1900. In an embodiment, the electronic device 1000 may be one of various electronic devices such as a personal computer, a laptop computer, a server, a workstation, a portable communication terminal, a personal digital assistant (PDA), a portable media player (PMP), a digital camera, a smartphone, a tablet computer, and a wearable device.

The main processor 1100 may control overall operations of the electronic device 1000. The main processor 1100 may control/manage operations of the components of the electronic device 1000. The main processor 1100 may process various operations for the purpose of operating the electronic device 1000. The touch panel 1200 may be configured to sense a touch input from a user under control of the touch driver integrated circuit 1202. The display panel 1300 may be configured to display image information under control of the display driver integrated circuit 1302.

The system memory 1400 may store data that are used in an operation of the electronic device 1000. For example, the system memory 1400 may include a volatile memory such as a static random access memory (SRAM), a dynamic RAM (DRAM), or a synchronous DRAM (SDRAM), and/or a nonvolatile memory such as a phase-change RAM (PRAM), a magneto-resistive RAM (MRAM), a resistive RAM (ReRAM), or a ferroelectric RAM (FRAM).

The storage device 1500 may store data regardless of whether a power is supplied. For example, the storage device 1500 may include at least one of various nonvolatile memories such as a flash memory, a PRAM, an MRAM, a ReRAM, and a FRAM. For example, the storage device 1500 may include an embedded memory and/or a removable memory of the electronic device 1000.

The audio processor 1600 may process an audio signal by using an audio signal processor 1610. The audio processor 1600 may receive an audio input through a microphone 1620 or may provide an audio output through a speaker 1630. The communication block 1700 may exchange signals with an external device/system through an antenna 1710. A transceiver 1720 and a modulator/demodulator (MODEM) 1730 of the communication block 1700 may process signals exchanged with the external device/system, based on at least one of various wireless communication protocols: long term evolution (LTE), worldwide interoperability for microwave access (WiMax), global system for mobile communication (GSM), code division multiple access (CDMA), Bluetooth, near field communication (NFC), wireless fidelity (Wi-Fi), and radio frequency identification (RFID).

The image processor 1800 may receive a light through a lens 1810. An image device 1820 and an image signal processor (ISP) 1830 included in the image processor 1800 may generate image information about an external object, based on a received light. The user interface 1900 may include an interface capable of exchanging information with a user, in addition to the touch panel 1200, the display panel 1300, the audio processor 1600, and the image processor 1800. For example, the user interface 1900 may include a keyboard, a mouse, a printer, a projector, various sensors, a human body communication device, etc.

The electronic device 1000 may further include the power management IC (PMIC) 1010, a battery 1020, and a power connector 1030. The power management IC 1010 may generate an internal power supply voltage from a power supplied from the battery 1020 or a power supplied from the power connector 1030, and may provide the internal power supply voltage to the main processor 1100, the touch panel 1200, the touch driver integrated circuit 1202, the display panel 1300, the display driver integrated circuit 1302, the system memory 1400, the storage device 1500, the audio processor 1600, the communication block 1700, the image processor 1800, and the user interface 1900.

The electronic device 100 described with reference to FIG. 1 may be included in semiconductor integrated circuits such as the main processor 1100, the touch driver integrated circuit 1202, the display driver integrated circuit 1302, the system memory 1400, the storage device 1500, the audio processor 1600, the communication block 1700, and the image processor 1800.

The power management integrated circuit 1010 may perform dynamic voltage scaling (DVS) of the semiconductor integrated circuits. For example, the power management integrated circuit 1010 may perform the dynamic voltage scaling by directly adjusting levels of voltages to be supplied to the semiconductor integrated circuits or providing the semiconductor integrated circuits with the voltage trim signal VAS as described with reference to FIG. 1.

Each of the components of the electronic device 1000 may include a safety monitor device. Also, the safety monitor device may be connected with each of channels between the components of the electronic device 1000. The safety monitor device may check the integrity of a signal, a voltage, or a current of each component or between components. The electronic device 1000 may be implemented in an in-vehicle infotainment system. The safety monitor device may be implemented based the ISO26262 or ASIL (Automotive Safety Integrity Level).

Alternatively, the electronic device 1000 may be implemented with various mobile devices such as a smartphone and a smart pad. Also, the electronic device 1000 may be implemented with various wearable devices such as a smart watch, smart glasses, and an augmented reality goggles.

In the above embodiments, components according to the present disclosure are described by using the terms "first", "second", "third", and the like. However, the terms "first", "second", "third", and the like may be used to distinguish components from each other and do not limit the order or sequence of the components unless the context indicates otherwise. Terms that are not described using "first," "second," "third", and the like in the specification, may still be referred to as "first," "second," "third", and the like in a claim. In addition, a term that is referenced with a particular ordinal number (e.g., "first" in a particular claim) may be described elsewhere with a different ordinal number (e.g., "second" in the specification or another claim).

In the above embodiments, components according to embodiments of the present disclosure are described by using blocks. The blocks may be implemented with various hardware devices, such as an integrated circuit, an application specific IC (ASCI), a field programmable gate array (FPGA), and a complex programmable logic device (CPLD), firmware driven in hardware devices, software such as an application, or a combination of a hardware device and software. Also, the blocks may include circuits implemented with semiconductor elements in an integrated circuit or circuits enrolled as intellectual property (IP).

According to the present disclosure, the accuracy of output voltages of LDO regulators is improved by a global control loop of controlling the output voltages of the LDO regulators to output target voltages. Also, a response speed of the output voltages of the LDO regulators is improved by a local control loop corresponding to a change of an output voltage of each of the LDO regulators. Also, the accuracy of the output voltages of the LDO regulators is improved by a calibration circuit of calibrating differences between the output voltages of the LDO regulators.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An electronic device comprising:
   an amplifier circuit configured to receive a feedback voltage and a reference voltage, and to amplify a difference between the feedback voltage and the reference voltage to output an amplified difference voltage;
   an analog-to-digital converter configured to convert the amplified difference voltage to a digital code including two or more bits; and
   low-dropout (LDO) regulators configured to output voltages based on the digital code,
   wherein each of the LDO regulators includes power transistors outputting a corresponding output voltage of the output voltages, drives one of the power transistors in a switching state, and drives each of remaining power transistors in a turned-on state or a turned-off state.

2. The electronic device of claim 1, wherein, in response to a decrease in the corresponding output voltage, each of the LDO regulators drives a power transistor of the switching state among the power transistors into the turned-on state and drives a power transistor of the turned-off state among the power transistors into the switching state.

3. The electronic device of claim 1, wherein, in response to an increase in the corresponding output voltage, each of the LDO regulators drives a power transistor of the switching state among the power transistors into the turned-off state and drives a power transistor of the turned-on state among the power transistors into the switching state.

4. The electronic device of claim 1, wherein, during a period where a power transistor of the switching state among the power transistors is turned on and is turned off, a power transistor of the turned-on state among the power transistors is always turned on, and a power transistor of the turned-off state among the power transistors is always turned off.

5. The electronic device of claim 1, wherein, in response to a decrease in the corresponding output voltage, each of the LDO regulators increases a time period in which a power transistor of the switching state among the power transistors is turned on during a switching period.

6. The electronic device of claim 5, wherein, in response to the decrease in the corresponding output voltage and the time period in which the power transistor of the switching state among the power transistors is turned on reaches the switching period, each of the LDO regulators drives the power transistor of the switching state among the power transistors into the turned-on state and drives a power transistor of the turned-off state among the power transistors into the switching state.

7. The electronic device of claim 1, wherein, in response to an increase in the corresponding output voltage, each of the LDO regulators decreases a time period, in which a power transistor of the switching state among the power transistors is turned on during a switching period.

8. The electronic device of claim 7, wherein, in response to the increase in the corresponding output voltage and the time period in which the power transistor of the switching state among the power transistors is turned on is "0", each of the LDO regulators drives the power transistor of the switching state among the power transistors into the turned-off state and drives a power transistor of the turned-on state among the power transistors into the switching state.

9. The electronic device of claim 1, wherein each of the LDO regulators further includes:
   a charge pump configured to generate a pump voltage in response to the digital code;
   a variable current source configured to output a feedback current increasing in response to an increase in the corresponding output voltage and decreasing in response to a decrease in the corresponding output voltage; and
   an analog-to-digital converter configured to generate a switch code for driving the power transistors based on the pump voltage and the feedback current.

10. The electronic device of claim 9, wherein the analog-to-digital converter includes:
    up transistors configured to output up currents in response to the pump voltage, respectively;
    down transistors respectively connected with the up transistors and configured to mirror the feedback current to sink different down currents; and
    inverters configured to generate the switch code from voltages of nodes between the up transistors and the down transistors.

11. The electronic device of claim 10, wherein the down currents include a first down current to an n-th down current (n being a positive integer more than "1"), and
    wherein an amount of a k-th down current (k being a positive integer more than "1" and equal to or less than "n") of the first down current to the n-th down current is k times an amount of the first down current.

12. The electronic device of claim 10, wherein the down transistors include a first down transistor to an n-th down transistor (n being a positive integer more than "1"), and
    wherein a size of a k-th down transistor (k being a positive integer more than "1" and equal to or less than "n") of the first down transistor to the n-th down transistor is k times a size of the first down transistor.

13. An electronic device comprising:
two or more low-dropout (LDO) regulators;
an amplifier circuit configured to receive a feedback voltage and a reference voltage, and to amplify a difference between the feedback voltage and the reference voltage to output an amplified difference voltage;
an analog-to-digital converter configured to convert the amplified difference voltage to a first digital code including two or more bits; and
a calibration circuit configured to receive output voltages of the two or more LDO regulators and to output second digital codes based on differences between the output voltages,
wherein the two or more LDO regulators adjust the output voltages in response to the first digital code and the second digital codes.

14. The electronic device of claim 13, wherein the first digital code is transferred in common to the two or more LDO regulators, and
wherein each of the second digital codes is transferred to a corresponding LDO regulator of the two or more LDO regulators.

15. The electronic device of claim 13, wherein each of the two or more LDO regulators generates a corresponding output voltage of the output voltages by generating a pump voltage based on the first digital code and a corresponding second digital code of the second digital codes, generating switch codes based on the pump voltage, and driving power transistors based on the switch codes.

16. The electronic device of claim 13, wherein the calibration circuit compares the feedback voltage and the output voltages and generates the second digital codes based on a result of the comparison.

17. The electronic device of claim 16, wherein the calibration circuit sequentially selects the output voltages for comparison with the feedback voltage and sequentially outputs the second digital codes respectively corresponding to the two or more LDO regulators.

18. The electronic device of claim 13, wherein the calibration circuit compares a first output voltage of the output voltages with a remaining output voltage(s) of the output voltages other than the first output voltage and generates the second digital codes based on a result of the comparison.

19. An electronic device comprising:
an integrated circuit;
a power rail configured to supply the integrated circuit with a power on the integrated circuit;
low-dropout (LDO) regulators distributed and disposed around the power rail, and configured to supply output voltages to the power rail; and
a global logic circuit configured to receive a feedback voltage from a feedback node on the power rail and to output a digital code to the LDO regulators,
wherein the LDO regulators generate the output voltages based on the digital code, and
wherein the global logic circuit includes:
an amplifier circuit configured to amplify a difference between the feedback voltage and a reference voltage to output an amplified difference voltage; and
an analog-to-digital converter configured to convert the amplified difference voltage to the digital code including two or more bits.

20. The electronic device of claim 19, wherein the global logic circuit further includes:
a reference voltage generator configured to receive a voltage trim signal and to generate the reference voltage having a level adjusted based on the voltage trim signal.

* * * * *